United States Patent [19]

Kim

[11] Patent No.: US 6,321,097 B1
[45] Date of Patent: Nov. 20, 2001

[54] METHOD FOR AUTOMATICALLY SWITCHING MODES IN A DUAL MODE CELLULAR PHONE

[75] Inventor: Hee-Deog Kim, Seoul (KR)

[73] Assignee: Samsung Electronics Co., Ltd. (KR)

[*] Notice: Subject to any disclaimer, the term of this patent is extended or adjusted under 35 U.S.C. 154(b) by 0 days.

[21] Appl. No.: 09/178,718

[22] Filed: Oct. 26, 1998

[51] Int. Cl.[7] .................................................. H04B 1/38
[52] U.S. Cl. .......................... 455/553; 455/552; 455/432
[58] Field of Search .................................. 455/552, 553, 455/515, 434, 435, 422, 426, 431, 432, 433, 445

[56] References Cited

U.S. PATENT DOCUMENTS

| 5,257,401 | * | 10/1993 | Dahlin et al. | 455/54.1 |
| 5,335,355 | * | 8/1994 | Tanaka et al. | 455/54.2 |
| 5,524,277 | * | 6/1996 | Yoshioka et al. | 455/89 |
| 5,564,077 | * | 10/1996 | Obayashi et al. | 455/89 |
| 5,781,612 | * | 7/1998 | Choi et al. | 455/54.1 |
| 5,911,120 | * | 6/1999 | Jarett et al. | 455/417 |
| 5,991,624 | * | 11/1999 | Ishida et al. | 455/435 |
| 5,995,829 | * | 11/1999 | Broderick | 455/418 |
| 6,009,325 | * | 12/1999 | Retzer et al. | 455/553 |
| 6,058,316 | * | 5/2000 | Takahashi | 455/552 |
| 6,075,981 | * | 6/2000 | Shah et al. | 455/434 |

* cited by examiner

Primary Examiner—William Trost
Assistant Examiner—Tilahun Gesesse
(74) Attorney, Agent, or Firm—Dilworth & Barrese, LLP

[57] ABSTRACT

A method is provided for automatically switching to a digital or an analog mode in a dual mode cellular phone in order to increase the call reception ratio and to reduce battery consumption. The method includes the step of checking whether or not the phone is set to a digital preference mode, upon power-on. It is then checked whether or not a digital signal is received from a base station, the phone being set to the digital mode upon receipt of the digital signal, when the phone is set to the digital preference mode. The phone is set to the analog mode, when the phone is not set to the digital preference mode or the digital signal is not received from the base station. A return is made to the step of checking whether or not the digital signal is received, when a call end key of the phone is not depressed or a call release message is not received from the base station.

6 Claims, 3 Drawing Sheets

METHOD FOR AUTOMATICALLY SWITCHING MODES IN A DUAL MODE CELLULAR PHONE

BACKGROUND OF THE INVENTION

1. Field of the Invention

The present invention relates to a dual mode cellular phone and, in particular, to a method for automatically switching a dual mode cellular phone to a digital or analog mode when a user is mobile.

2. Description of the Related Art

A dual mode cellular phone is compatible with both a digital Code Division Multiple Access (CDMA) communication system and an analog Advanced Mobile Phone Service (AMPS) communication system. This dual mode cellular phone is tuned to the digital communication system in a common service area where the digital and analog base stations are both installed, and to the analog communication system in an analog service area where only the analog base station is installed.

When the dual mode cellular phone is set to a digital preference mode, it is tuned to the digital base station in the common service area. However, in the analog service area, upon power-up, the dual mode cellular phone first attempts to search for the digital base station. If the search fails, then the dual mode cellular phone searches for the analog base station. Subsequently, the dual mode cellular phone is tuned to the analog base station, allowing the user to talk over the phone.

When the user terminates the call upon completion of the telephone conversation, the dual mode cellular phone again searches for the digital base station for a specified time (e.g., approximately 60 seconds). Similarly, even when the user terminates an incoming call after completion of the conversation, the dual mode cellular phone searches for the digital base station for the specified time. Further, even when the dual mode cellular phone is set to an analog mode, it searches for the digital base station in an idle state at specified time intervals (e.g., 3 minutes).

Searching for the digital base station disadvantageously causes the dual mode cellular phone to consume twice the amount of operating current as that consumed in the idle state. Further, and perhaps even more disadvantageous, the dual mode cellular phone cannot receive an incoming call during the search for the digital base station. Accordingly, the dual mode cellular phone may have a reduced call reception ratio and a reduced battery run-time.

SUMMARY OF THE INVENTION

It is an object of the present invention to provide a method for automatically switching a dual mode cellular phone to an analog or digital mode according to a change of the service area in order to increase the call reception ratio and reduce battery consumption.

It is another object of the present invention to provide a method for reducing the frequency of searching for a digital base station in an analog service area in order to reduce battery consumption and increase the call reception ratio.

To achieve the above and other objects, there is provided a method for automatically switching to a digital or analog mode in a dual mode cellular phone. The method includes the steps of: checking whether or not the phone is set to a digital preference mode, upon power-on; checking whether or not a digital signal is received from a base station and setting the phone to the digital mode upon receipt of the digital signal, when the phone is set to the digital preference mode; setting the phone to the analog mode, when the phone is not set to the digital preference mode or the digital signal is not received from the base station; and returning to the step of checking whether or not the digital signal is received, when a call end key of the phone is not depressed or a call release message is not received from the base station.

Further, the dual mode cellular phone returns to the step of checking whether or not the digital signal is received, when the phone is set to the analog mode, a call attempt has failed, and the phone is set to a redial-on mode wherein an unsuccessful predetermined number of redials have been performed or a redial-off mode.

Moreover, the dual mode cellular phone returns to the step of checking whether or not the digital signal is received, when the phone is set to the analog mode, a registration attempt has been successfully performed in an access state, and a predetermined time interval has elapsed with respect to the phone having entered an idle state.

Additionally, the dual mode cellular phone returns to the step of checking whether or not the digital signal is received, when the phone is set to the analog mode and receives an analog signal with a low power or loses a word synchronization signal.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

A preferred embodiment of the present invention will be described in detail with reference to the accompanying drawings. In the specification, well-known functions or constructions which may obscure the invention in unnecessary detail are not described in detail.

Figure 1:
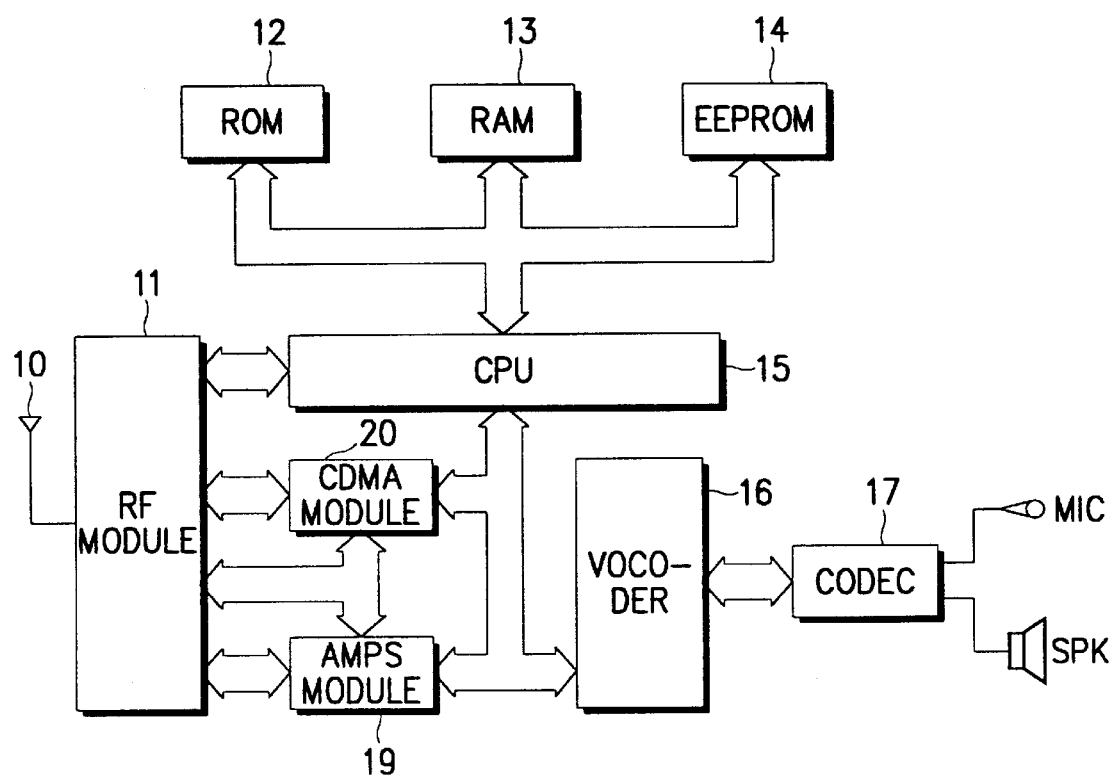
FIG. 1 is a block diagram of a dual mode cellular phone to which the present invention is applied.

FIG. 1 is a diagram of a dual mode cellular phone to which the present invention is applied. A radio frequency (RF) module 11 tunes the dual mode cellular phone to an RF channel and amplifies an RF signal received from an antenna 10. The RF module 11 includes a baseband analog (BBA) circuit. The BBA circuit includes a reception circuit for down-converting an analog intermediate frequency (IF) signal to a baseband frequency and converting the baseband signal to digital data. The BBA circuit also includes a transmission circuit for converting the digital data to an analog baseband signal and up-converting the baseband signal to an IF signal. A central processing unit (CPU) 15 controls the overall operations of the dual mode cellular phone. A read only memory (ROM) 12 stores a program and data for controlling the dual mode cellular phone. A random access memory (RAM) 13 temporarily stores various variables and data generated in the course of executing the program. An electrically erasable and programmable ROM (EEPROM) 14 permanently stores a telephone number and an electronic serial number (ESN) of the cellular phone and system parameters. An AMPS module 19 modulates/demodulates an analog AMPS signal, and a CDMA module 20 modulates/demodulates a digital CDMA signal. A vocoder 16 encodes/decodes a voice frame. A CODEC 17 converts a digital voice signal to an analog voice signal and converts the analog voice signal to the digital voice signal. The CODEC 17 is connected to a microphone MIC and a speaker SPK.

Figure 2A:
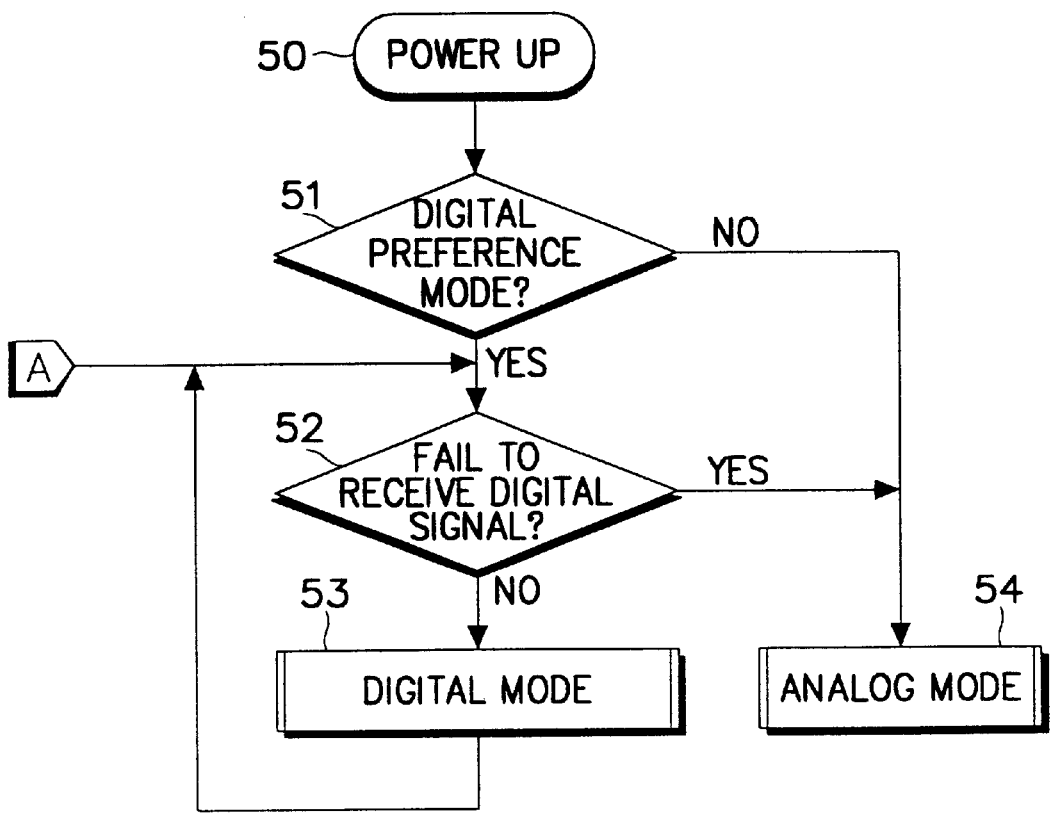
FIGS. 2A and 2B are flowcharts illustrating a method for automatically switching a dual mode cellular phone to an analog or digital mode according to a change of the service area.
Figure 2B:
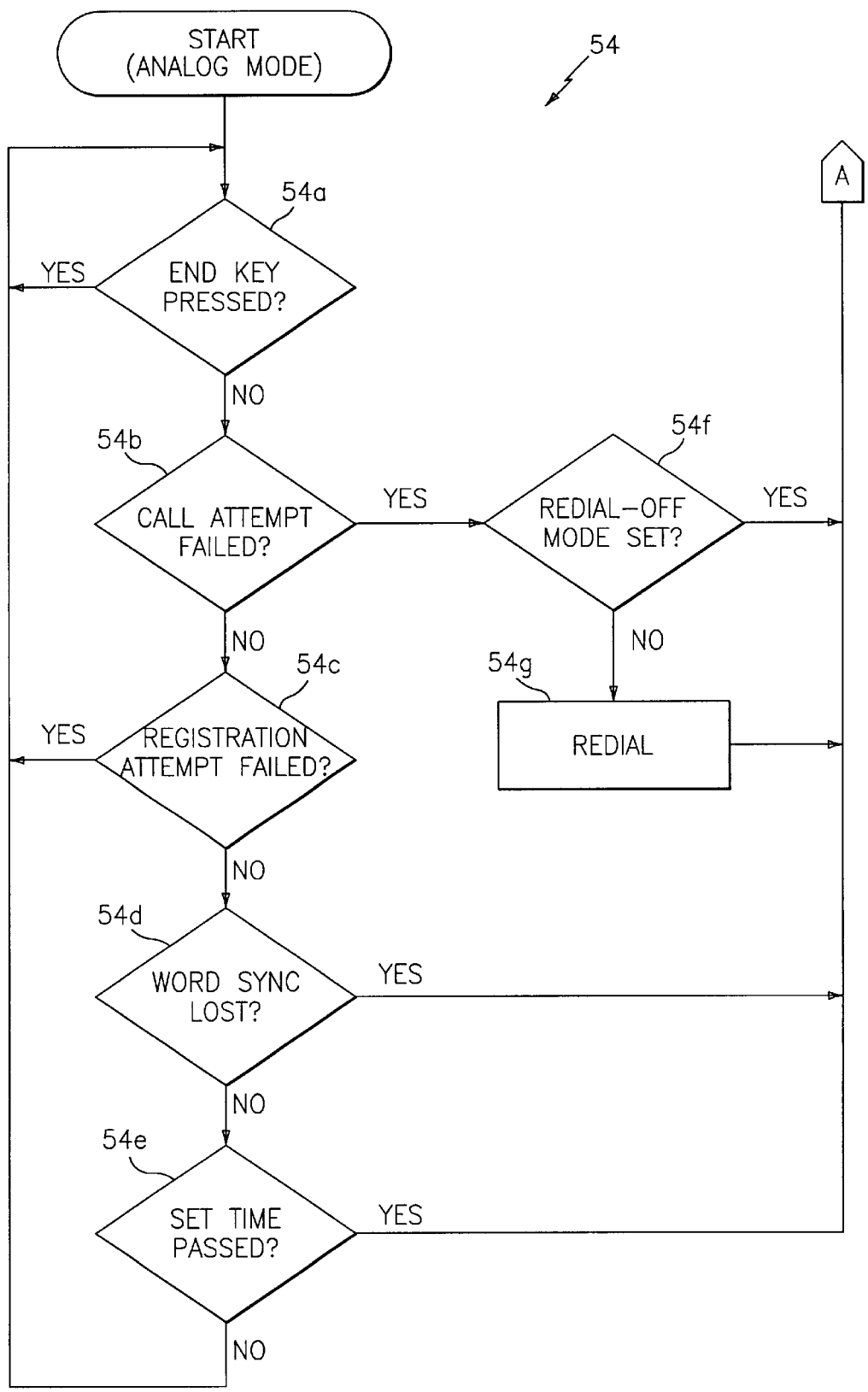

FIGS. 2A and 2B are flowcharts illustrating a method for automatically selecting an analog or digital mode of a dual mode cellular phone according to a change of the service area. As will be described hereinbelow, the method provides a reduction of the current consumption and an increase of the call reception ratio of the dual mode cellular phone in the analog service area.

In FIG. 2A, as the dual mode cellular phone is powered up (step 50), CPU 15 checks whether or not the dual mode cellular phone is set to the digital preference mode (step 51). In the digital preference mode, the digital mode is selected in preference to the analog mode in the common service area. If the dual mode cellular phone is set to the digital preference mode, then CPU 15 determines whether or not a digital signal is received from the base station (step 52). If the digital signal is received from the base station, then CPU 15 is set to the digital mode (step 53) in synchronization with the received digital signal. However, if the dual mode cellular phone does not receive the digital signal (and thus, fails the synchronization), then CPU 15 sets a digital signal detection failure flag.

In the digital mode, the dual mode cellular phone stays in an idle state where it is ready to receive an incoming call or send (originate) an outgoing call. During the idle state, if the cellular phone receives an incoming call or originates an outgoing call, the cellular phone enters an access state and then transmits an answering message or a transmission message. If a message transmission fails, then the cellular phone returns to the idle state. However, if the message is successfully transmitted a speech path is connected to provide the user with the call service.

While receiving the digital call service, if the user of the dual mode cellular phone moves to the analog service area where the digital base station is not installed, then the cellular phone fails to detect (receive) the digital signal. Accordingly, CPU 15 detects the acquisition failure of the digital signal (step 52) and is set to the analog mode (step 54).

FIG. 2B illustrates a subroutine 54 of the analog mode. If the dual mode cellular phone receives an analog message in tune with an analog control channel, then the cellular phone is set to an analog idle state. Upon receiving an incoming call or sending an outgoing call in the idle state, the dual mode cellular phone goes to the access state to transmit a transmission message or an answering message. Subsequently, when the analog call is connected, the cellular phone goes to a communication state to provide the call service. In this condition, if the user terminates the call, the conventional dual mode cellular phone is set to the digital mode and then initialized. However, the dual mode cellular phone according to the present invention stays in the idle state of the analog mode when the call is terminated by depressing an END key or in response to a call release message from the base station. Specifically, when the call service is terminated during the analog mode, CPU 15 of the cellular phone checks whether or not the END key is depressed or the call release message is received (step 54a).

The CPU 15 returns to an initialization state (i.e., the idle state of the analog mode) when the END key is depressed or the call release message is received.

Further, it is checked whether or not a call attempt performed in the access state has failed (step 54b). If a call attempt has failed, then CPU 15 checks whether or not a redial-off mode is set (step 54f). If the redial-off mode is set, then the procedure returns to step 52 to detect the digital signal. However, if the redial-off mode is not set (i.e., a redial-on mode is set), then the CPU 15 redials the phone number a predetermined number of times (step 54g). The CPU 15 enters the communication mode when the speech path is connected. However, if CPU 15 fails to connect a call in the redial-on mode, then the procedure returns to step 52 to detect the digital signal.

Thereafter, the CPU 15 determines the result of a registration attempt performed in the access state (step 54c). If it is determined that the registration attempt has failed, then CPU 15 maintains the idle state of the analog mode. However, if the registration attempt is successful, then CPU 15 checks whether or not a word synchronization (sync) signal is lost in the idle state due to a fading phenomenon or an area where the analog signal has low power (step 54d). If it is determined that the word sync signal is lost, then CPU 15 concludes that the cellular phone is in a non-analog service area and returns to step 52 to detect the digital signal in order to search for the digital base station. However, if the word sync signal is not lost, then CPU 15 checks whether or not a predetermined time interval (e.g., 5 minutes) has passed after entering the idle state (step 54e). If it is determined that the above predetermined time interval has passed, then the procedure returns to step 52. In this condition, the conventional cellular phone having only the analog mode re-scans the channels to search for the best channel (i.e., having the highest signal level) and maintains the idle state. In contrast, the cellular phone according to an embodiment of the present invention scans the channels to detect the digital signal. Therefore, when the cellular phone enters the digital service area, the cellular phone searches for the digital base station within a predetermined time period (e.g., approximately 2.5 minutes) in order to provide digital call service which is superior in quality to the analog call service.

As described above, the method of the present invention automatically switches to the digital or analog mode in order to increase the call reception ratio and reduce the current consumption of the dual mode cellular phone. That is, in the analog service area where only the analog base station is installed, the frequency of searching for the digital signal is reduced so as to reduce the current consumption and increase the call reception ratio of the dual mode cellular phone reduces.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for automatically switching to one of a digital and an analog mode in a dual mode cellular phone, comprising the steps of:

(a) checking whether the phone is set to a digital preference mode, upon power-on;

(b) checking whether a digital signal is received from a base station and setting the phone to the digital mode upon receipt of the digital signal, when the phone is set to the digital preference mode;

(c) setting the phone to the analog mode, when the phone is not set to the digital preference mode in said step (a) or the phone does not receive the digital signal from the base station in said step (b); and (d) returning to said step (b), when a call end key of the phone is not depressed or the phone does not receive a call release message from the base station in step (c).

2. The method as claimed in claim 1, further comprising the step of returning to said step (b), when the phone is set to the analog mode, a call attempt has failed, and the phone is set to one of a redial-on mode wherein an unsuccessful predetermined number of redials have been performed and a redial-off mode.

3. The method as claimed in claim 1, further comprising the step of returning to said step (b), when the phone is set to the analog mode, a registration attempt has been successfully performed in an access state, and a predetermined time interval has elapsed with respect to the phone having entered an idle state.

4. The method as claimed in claim 1, further comprising the step of returning to said step (b), when the phone is set to the analog mode and one of receives an analog signal with a low power and loses a word synchronization signal.

5. A method for automatically switching to one of a digital and an analog mode in a dual mode cellular phone, comprising the steps of:

(a) checking whether the phone is set to a digital preference mode, upon power-on;

(b) checking whether a digital signal is received from a base station and setting the phone to the digital mode upon receipt of the digital signal, when the phone is set to the digital preference mode;

(c) setting the phone to an analog mode, when the phone is not set to the digital preference mode in said step (a) or the phone does not receive the digital signal from the base station in said step (b); and (d) returning to said step (b), when a call end key of the phone is not depressed, a call release message is not received from the base station, the phone is set to a redial-off mode after a call attempt, or a call is not connected upon redialing in a redial-on mode in step (c).

6. The method as claimed in claim 5, wherein the phone maintains the analog mode, when the phone is set to the analog mode and a registration attempt performed in an access state has failed.

* * * * *